3,103,289
LUGGAGE CARRIERS FOR AUTOMOBILES
William L. Clary, Denver, Colo., assignor of fifty percent to Lon Blanscet, Denver, Colo., and of twenty-five percent to Ralph G. Wooden, Los Angeles, Calif.
Filed Oct. 3, 1960, Ser. No. 60,094
2 Claims. (Cl. 214—450)

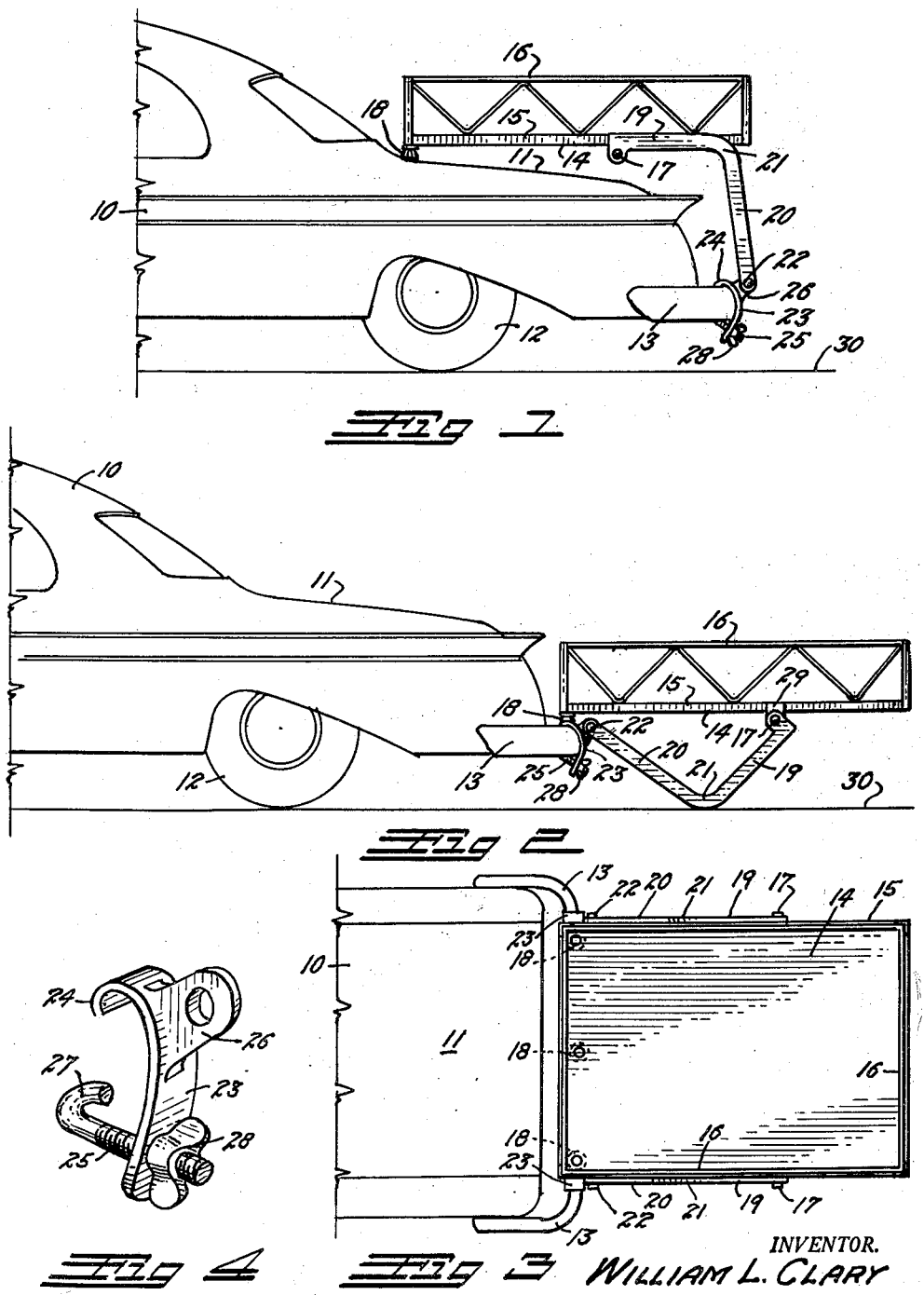

This invention relates to a luggage carrier for automobiles and has for its principal object the provision of a neat, highly efficient carrier construction which can be quickly and easily swung from an elevated, travelling position over the trunk or rear deck of an automotive vehicle to and from a convenient table height, loading and unloading position at the rear of the vehicle without it being necessary to connect or disconnect the carrier from the vehicle at any time.

Another object of the invention is to provide a luggage carrier construction having the above advantages which will solidly and safety maintain the luggage in place in both the elevated travelling position and in the lowered loading and unloading position without lateral tilting.

A further object is to provide a luggage carrier of the above described type which will not interfere with the normal use of the automobile trunk or the lid thereof.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a side elevational view of the improved luggage carrier illustrating it in the travelling position on a conventional automobile;

FIG. 2 is a similar side elevational view thereof showing the carrier in the loading and unloading position;

FIG. 3 is a top plan view of the carrier in the position of FIG. 1; and

FIG. 4 is a perspective view of a bumper clamp assembly.

In the drawing a conventional automobile is shown at 10 with its rear deck at 11, rear wheels at 12 and rear bumper at 13. This invention is designed for attachment to the rear bumper 13 and is so arranged that it can be swung from a position over the rear deck as shown in FIG. 1 to a ground-supported position at the rear of the bumper 13 as shown in FIG. 2.

The improved carrier includes a luggage platform 14 surrounded by a rectangular angle iron platform frame 15 upon which a rectangular luggage retaining fence 16 is welded or otherwise mounted.

A pivot stud 17 is welded to and projects outwardly from a downwardly-depending ear 29 at each side of the platform frame 15 rearwardly of the lateral center line of the frame. A plurality of resilient vacuum cups 18 are mounted beneath and extend downwardly from the front edge of the frame 15.

An L-shaped supporting arm is pivotally mounted on each of the pivot studs 17. Each supporting arm comprises a relatively short upper arm portion 19 rigidly joined to a relatviely long lower arm portion 20 at an angle of substantially 90° to form an elbow 21.

In the elevated travelling position, the short upper arm portions 19 extend rearwardly from the pivot studs 17 alongside the frame 15 and the long lower arm portions 20 extend downwardly to a pivotal connection with a bumper pivot bolt 22 mounted in a pivot ear 26 on a bumper clamp plate 23.

The bumper clamp plates 23 are mounted on the rear bumper 13, in spaced-apart relation, in any suitable manner. As illustrated, each bumper clamp plate 23 is provided with a hooked upper extremity 24 which hooks over the upper edge of the rear bumper and with a hooked clamp bolt 25 which extends through an opening in the lower extremity of each bumper plate. Each clamp bolt 25 terminates in a bumper hook 27 adapted to be hooked upwardly over the lower edge of the rear bumper. A clamp nut 28 is threaded onto each bolt 25 by means of which the bumper plate can be clamped against the rear surface of the bumper to clamp the bumper plate in fixed position thereon.

It can be seen that when in the horizontal, elevated or travelling position, the arms 19—20 support the rear of the platform frame 15 from the rear bumper 13 and the vacuum cups 18 support the front of the platform frame 15 from and also serve to detachably attach the frame to the rear deck 11 of the automobile 10.

The luggage platform 14 can be lowered for loading or unloading by simply pulling it rearwardly to release the vacuum cups 18, thence continuing the rearward movement until the elbows 21 of the arms rest upon the ground with the vacuum cups 18 resting on the rear bumper as shown in FIG. 2.

It will be noted that when in the elevated position the pivot studs 17 are positioned forwardly of the pivot bolts 22 so that the weight of the luggage on the platform 14 will tend to force the forward extremities of the upper short arm portions 19 downwardly. This downwardly acting force tends to force the lower longer arm portions 20 forwardly so as to resist rearward movement of the load. Thus, it can be seen that the forward thrust of the supporting arms is in direct proportion to weight of the load being carried so that there is no tendency for the platform to swing rearwardly from its travelling position. It will also be noted that since the pivot studs 17 are positioned rearwardly of the transverse center line of the platform 14, the latter will remain horizontal when in the lowered loading position. However, to assist in placing or removing heavy luggage, the rear of the platform can be tilted downwardly to the ground if and when desired.

Attention is called to the fact that full access can be had to the conventional automobile trunk and lid by simply moving the improved luggage carrier from the travelling to the loading position.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A luggage carrier for an automobile vehicle of a type having a rear deck and a rear bumper comprising: two bumper clamps attached to said rear bumper in spaced-apart relation, a first pivot means on each clamp; two swing arms, each comprising a first relatively long portion pivotally mounted at its lower extremity to one of said first pivot means and normally extending vertically therefrom, a second relatively short portion integral with each long portion and extending rigidly and horizontally forward therefrom to form a rigid substantially 90 degree elbow; a substantially rectangular luggage platform detachably supported at its forward extremity on said vehicle rear deck, second pivot means on each of the sides of said platform pivotally supporting said platform between the forward extremities of said short arm portions and pivotally connecting the same thereto, said second pivot means providing the sole support for the rear extremity of said platform, said second pivot means being attached to said platform at points spaced rearwardly of the transverse center line of the platform, and the distance from the inner extremity of said platform to the second pivot means being greater than the distance between said first and second pivot means, whereby when the swing arms are swung rearwardly until the said elbows are in contact with the ground, the forward extremity of said platform will be in contact with and supported by said vehicle.

2. A luggage carrier as defined in claim 1, and further including a platform frame having vertical side and end walls attached to said platform, and vacuum cups mounted on and extending downwardly from the forward extremity of said platform.

References Cited in the file of this patent
UNITED STATES PATENTS

| | | |
|---|---|---|
| 2,479,035 | Burkey | Aug. 16, 1949 |
| 2,521,815 | Will | Sept. 12, 1950 |
| 2,567,104 | Di Fonzo | Sept. 4, 1951 |
| 2,797,007 | McNeely | June 25, 1957 |